United States Patent Office 3,372,179
Patented Mar. 5, 1968

3,372,179
S-SUBSTITUTED-β-MERCAPTOTHIOLBUTYRATES
Ferdinand B. Zienty, Warson Woods, and Alfred A. Schleppnik, St. Louis, Mo., assignors to Monsanto Company, St. Louis, Mo., a corporation of Delaware
No Drawing. Filed July 15, 1965, Ser. No. 472,329
11 Claims. (Cl. 260—455)

ABSTRACT OF THE DISCLOSURE

Alkyl or aryl esters of S-substituted-β-mercapto thiolbutyric acid. These compounds are useful for various biological applications such as herbicides, insecticides.

This invention relates to thiolbutyrates and to the process for preparing the same. More particularly, it relates to S-substituted-β-mercaptothiolbutyrates of the formula Formula 1

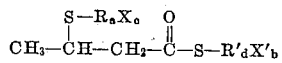

$$CH_3-CH-CH_2-C-S-R'_dX'_b$$

wherein R and X' are each alkyl containing from 1 to 8 carbon atoms; R' and X are each selected from the group consisting of phenyl, lower alkyl phenyl, and the chloro, bromo, nitro, lower alkoxy and di(lower alkyl) amino derivatives of said phenyl and lower alkyl phenyl; $a$, $b$, $c$ and $d$ are each an integer from zero to 1, $a+b$ equals an integer from zero to 1, and $a+c$ and $b+d$ each equals 1. It is to be noted that, as used herein, "lower" alkyl or alkoxy means those groups wherein the alkyl radical contains up to 4 carbon atoms.

These novel compounds, useful as insecticides and/or herbicides, are prepared by reacting suitable thiolcrotonates with suitable thiols in the presence of a catalytic amount of certain bases. More specifically, the novel compounds of this invention are prepared by a process wherein the suitable thiolcrotonate, the suitable thiol and a suitable catalytic base are placed in intimate contact until the reaction is complete and the reactants are converted to the corresponding S-substituted-β-mercaptothiolbutyrates. The intimate contact is achieved by preparing a solution of the reactants and the catalyst using an inert anhydrous solvent.

The following nonlimiting examples are given to more fully demonstrate and describe the subject invention; all parts, percentages and proportions are by weight unless otherwise indicated.

*Example 1.—Ethyl β-phenylthiothiolbutyrate*

About 1.30 grams (0.01 mole) of ethylthiolcrotonate and 1.10 grams (0.01 mole) of mercaptobenzene are mixed in a conventional stirred reaction vessel at about 20° C. About 1 drop of a 1 N solution of triethylamine in benzene is added while stirring. An exothermic reaction occurs with the temperature of the reaction mass rising from room temperature to about 80° C. The reaction is complete after about 5 minutes. The solution is diluted with about 30 ml. of diethyl ether and washed with about 25 ml. of 5% hydrochloric acid and 60 ml. of water. The crude product is dried over calcium chloride, and then distilled in a short path apparatus. About 2.2 grams of a colorless liquid product is separated. Infrared absorption analysis of a sample of the recovered liquid product shows the peak at 1695 cm.$^{-1}$, characteristic for the

group. Sulfur content of 26.5% is found compared to the calculated amount of 26.7% for $C_{12}H_{16}OS_2$, the empirical formula for ethyl β-phenylthiothiolbutyrate.

*Example 2.—Phenyl β-phenylthiothiolbutyrate*

To a solution of 3.6 grams of phenyl thiolcrotonate and 2.2 grams of mercaptobenzene in 5 ml. of toluene, one drop of triethylamine is added. The reaction mass is treated as in Example 1 affording 4.8 grams of a yellow liquid. Samples of the product are analyzed by nuclear magnetic resonance, and infrared absorption spectrum. These analyses, along with the element analytical result of 22.0% sulfur compared with a theoretical content of 22.0% sulfur, identify the product as phenyl β-phenylthiothiolbutyrate, with an empirical formula $C_{16}H_{16}OS_2$.

*Example 3.—Tert-butyl-β-(4-chlorophenylthio) thiolbutyrate*

About 6.2 grams of tert-butyl thiolcrotonate and about 5.8 grams of 4-chloromercaptobenzene are dissolved in 25 ml. of dioxane. To this solution, one drop of 1 N triethylamine solution in benzene is added. The reaction is allowed to proceed freely, and the mixture is left at room temperature for about 16 hours. About 10.3 grams of product are separated by distillation using a short path apparatus. Infrared absorption analysis shows a peak at 1685 cm.$^{-1}$ indicating the presence of a C=O group. Actual element content analytically determined and compared with calculated values for the compound

$$C_{14}H_{19}ClOS_2$$

are as follows:

Calculated (percent): chlorine, 11.7; sulfur, 21.2.
Found (percent): chlorine, 11.6; sulfur, 21.3.

The above analysis indicates an 85% yield of tert-butyl β-(4-chlorophenylthio)thiolbutyrate.

*Example 4.—4-chlorophenyl β-(4-chlorophenylthio) thiolbutyrate*

About 4.2 grams of 4-chlorophenyl thiolcrotonate are dissolved in about 10 ml. of dioxane, and 2.9 grams of 4-chloromercaptobenzene is added. In about 10 minutes after one drop 1 N triethylamine is added, the reaction is completed. The crude product is treated as in Example 1 and distilled using a short path apparatus. About 6.9 grams of 4-chlorophenyl β-(4-chlorophenylthio)thiolbutyrate are recovered indicating a yield of about 97%. Elemental sulfur analysis shows the presence of 17.5% sulfur as compared with the theoretical 17.9% sulfur. Infrared absorption analysis and nuclear magnetic resonance analysis also indicate the product to be 4-chlorophenyl-β-(4-chlorophenylthio)thiolbutyrate.

*Example 5.—Phenyl β-ethylthiothiolbutyrate*

About 2.2 grams of phenyl thiolcrotonate and about 1.2 grams of ethanethiol are dissolved in about 10 ml. of toluene. To this solution about 1 drop of 1 N solution of triethylamine in benzene is added. The reaction is allowed to proceed at room temperature for about 48 hours. Distillation of the reaction mass affords phenyl β-ethylthiothiolbutyrate.

*Examples 6 through 16*

Following the procedure of Examples 1 through 5, other novel S-substituted-β-mercaptothiolbutyrates are prepared from suitable thiols and thiolcrotonates. Selected examples of such compounds and preparations are given in the following table.

TABLE I

| Example | Thiol | Thiolcrotonate | Catalytic Base | Thiolbutyrate |
|---|---|---|---|---|
| 6 | n-Hexanethiol | 4-ethoxyphenyl thiolcrotonate. | Pyridine | 4-ethoxyphenyl-β-(n-hexylthio)thiolbutyrate. |
| 7 | 2-ethylhexanethiol | Phenyl thiolcrotonate | Triethylamine | Phenyl β-(2-ethylhexylthio)thiolbutyrate. |
| 8 | 4-n-butyl mercaptobenzene | Ethyl thiolcrotonate | Dimethylethylamine | Ethyl β-(4-n-butylphenylthio)thiolbutyrate. |
| 9 | 3-nitro-4-mercaptotoluene | Phenyl thiolcrotonate | Triethylamine | Phenyl β-(3-nitro-p-tolylthio)thiolbutyrate. |
| 10 | Mercaptobenzene | 4-acetamidophenyl thiolcrotonate. | Pyridine | 4-acetamidophenyl β-(phenylthio)thiolbutyrate. |
| 11 | 4-ethoxy mercaptobenzene | Ethyl thiolcrotonate | Triethylamine | Ethyl β-(4-ethoxyphenylthio)thiolbutyrate. |
| 12 | 4-dimethylamino mercaptobenzene. | Phenyl thiolcrotonate | Tributylamine | Phenyl β-(4-dimethylamino phenylthio)thiolbutyrate. |
| 13 | Mercaptobenzene | Methyl thiolcrotonate | Triethylamine | Methyl β-(phenylthio)thiolbutyrate. |
| 14 | Methanethiol | Phenyl thiolcrotonate | Pyridine | Phenyl β-(methylthio)thiolbutyrate. |
| 15 | tert-Butanethiol | ....do | Triethylamine | Phenyl β-(tert-butylthio)thiolbutyrate. |
| 16 | Mercaptobenzene | tert-Butyl thiolcrotonate | Pyridine | tert-Butyl β-(phenylthio)thiolbutyrate. |

The compounds of this invention exhibit properties which make them useful for various biological applications such as herbicides, insecticides and the like. For example, the compound of Example 2 shows herbicidal activity against pigweed and morning glory. Also, the compounds of Example 3 and 4 are each toxicants for use against mosquito larvae. Other compounds of this invention exhibit similar biological properties.

The following nonlimiting examples are given to more fully demonstrate the process of this invention, all parts, percentages and proportions are by weight unless otherwise indicated.

*Example 17*

About 3.6 grams of ethyl thiolcrotonate and 1.85 grams of ethanethiol are dissolved in 5 ml. of toluene and 1 drop of triethylamine is added. The reaction is allowed to proceed at room temperature. After the reaction is completed, distillation of the reaction mass affords about 5.1 grams of a greenish liquid product which by analysis is identified as ethyl β-ethylthio thiolbutyrate. A 98% yield based on raw materials is thus indicated.

*Example 18*

Essentially equal molar amounts of n-butyl thiolcrotonate and n-butanethiol are dissolved in toluene. Pyridine is added to give a concentration of about 0.1% by weight based upon the weight of n-butanethiol. The reaction is allowed to proceed at room tmperature. After completion of the reaction, distillation of the reaction product affords n-butyl-β-n-butylthiothiolbutyrate.

While the invention has been described herein with regard to certain specific embodiments, it is not so limited. It is to be understood that variations and modifications thereof may be made by those skilled in the art without departing from the spirit and scope of the invention.

What is claimed is:

1. A thiolbutyrate of the formula

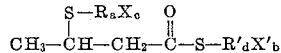

wherein R and X' are each alkyl containing from 1 to 8 carbon atoms, R' and X are each selected from the group consisting of phenyl, lower alkyl phenyl, and the chloro, bromo, nitro, lower alkoxy and di(lower alkyl) amino derivatives of said phenyl and lower alkyl phenyl; $a$, $b$, $c$ and $d$ are each an integer from zero to 1, $a+b$ equals an integer from zero to 1, $a+c$ and $b+d$ each equals 1.

2. A thiolbutyrate of claim 1 wherein $a$ and $d$ are each zero.

3. A thiolbutyrate of claim 1 wherein $b$ and $c$ are each zero.

4. A thiolbutyrate of claim 1 wherein $a$ and $b$ are each zero.

5. Methyl β-phenylthiothiolbutyrate.
6. Phenyl β-phenylthiothiolbutyrate.
7. Tert-butyl β-phenylthiothiolbutyrate.
8. Phenyl β-methylthiothiolbutyrate.
9. Phenyl β-tert-butylthiothiolbutyrate.
10. Tert-butyl-β-(4-chlorophenylthio)thiolbutyrate.
11. 4-chlorophenyl β-(4-chlorophenylthio)thiolbutyrate.

References Cited

UNITED STATES PATENTS 2,427,582  9/1947  Vinton _____ 260—455
2,846,461  8/1958  Thompson et al. _____ 260—455

OTHER REFERENCES

Houben-Weyl: Methoden der Organischen Chemie (1955), Band IX, pp. 124–125 relied on.

CHARLES B. PARKER, *Primary Examiner.*

B. BILLIAN, L. C. MARUZO, *Assistant Examiners.*